(12) United States Patent
Shi et al.

(10) Patent No.: US 11,703,439 B1
(45) Date of Patent: Jul. 18, 2023

(54) TESTING HYDROGEN PERMEABILITY OF NON-METALLIC PIPES

(71) Applicant: ZHEJIANG UNIVERSITY, Zhejiang (CN)

(72) Inventors: Jianfeng Shi, Zhejiang (CN); Jinyang Zheng, Zhejiang (CN); Riwu Yao, Zhejiang (CN); Zhoutian Ge, Zhejiang (CN); Zhongzhen Wang, Zhejiang (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/105,362

(22) Filed: Feb. 3, 2023

Related U.S. Application Data

(63) Continuation of application No. PCT/CN2022/141883, filed on Dec. 26, 2022.

(30) Foreign Application Priority Data

Jun. 29, 2022 (CN) .......................... 202210747875.2

(51) Int. Cl.
    *G01N 15/08* (2006.01)
(52) U.S. Cl.
    CPC ..... *G01N 15/0826* (2013.01); *G01N 15/0806* (2013.01)
(58) Field of Classification Search
    CPC .... G01N 15/00; G01N 15/08; G01N 15/0806; G01N 15/0826
    See application file for complete search history.

(56) References Cited

U.S. PATENT DOCUMENTS

2018/0073956 A1    3/2018  Feicht

FOREIGN PATENT DOCUMENTS

| CN | 103674808 |   | 3/2014 |             |
|----|-----------|---|--------|-------------|
| CN | 103674808 A | * | 3/2014 | ............. G01N 15/08 |
| CN | 112763381 |   | 5/2021 |             |
| CN | 113188978 |   | 7/2021 |             |
| CN | 113188978 A | * | 7/2021 | ......... G01N 15/0826 |
| CN | 215894320 |   | 2/2022 |             |
| CN | 114324108 |   | 4/2022 |             |
| CN | 114636523 |   | 6/2022 |             |

(Continued)

OTHER PUBLICATIONS

Office Action in Chinese Appln. No. 2022107478752, dated Aug. 9, 2022, 23 pages (Submitted with Machine/Partial Translation).

(Continued)

*Primary Examiner* — Nguyen Q. Ha
(74) *Attorney, Agent, or Firm* — Fish & Richardson P.C.

(57) ABSTRACT

Methods, apparatus, and systems for testing a hydrogen permeability of a non-metallic pipe are provided. In one aspect, an apparatus for testing a hydrogen permeability of a non-metallic pipe includes: pipe sealing pieces, a test cylinder, a high pressure gas source, a gas exhaust tube, a vacuum pump, and a pressure sensor. A plurality of circumferential reinforcement pieces are disposed on a circumferential inner wall surface of a cylindrical body of the test cylinder to be in contact with an outer surface of a to-be-tested pipe placed in the test cylinder and perform circumferential reinforcement on the to-be-tested pipe.

14 Claims, 6 Drawing Sheets

(56) References Cited

FOREIGN PATENT DOCUMENTS

CN        114813452  A    7/2022
WO    WO 2016161513      10/2016

OTHER PUBLICATIONS

Office Action in Chinese Appln. No. 2022107478752, dated Aug. 29, 2022, 22 pages (Submitted with Machine/Partial Translation).

Santucci et al., "Testing of dense Pd—Ag tubes:Effect of pressure and membrane thickness on the hydrogen permeability," Journal of Membrane Science, Aug. 2013, 444:378-383.

Shang et al., "Research status-in-situ and key challenges in pipeline transportation of hydrogen-natural gas mixtures," Chemical Industry and Engineering Progress, Dec. 2021, 40(10):5499-5505 (with English abstract).

International Search Report and Written Opinion in International Appln. No. PCT/CN2022/141883, dated Mar. 14, 2023, 16 pages.

\* cited by examiner

TESTING HYDROGEN PERMEABILITY OF NON-METALLIC PIPES

CROSS-REFERENCE TO RELATED APPLICATIONS

This application is a continuation application of international PCT Application No. PCT/CN2022/141883 filed on Dec. 26, 2022, which claims priority to Chinese patent application No. 202210747875.2 filed on Jun. 29, 2022. The entire contents of these applications are incorporated herein by reference.

TECHNICAL FIELD

The present disclosure relates to the field of pipe tests and in particular to apparatuses and methods for testing a hydrogen permeability of a non-metallic pipe.

BACKGROUND

In a hydrogen or hydrogen-doped environment, obvious hydrogen embrittlement may occur in metal materials. That is, permeation of hydrogen in the metal materials results in reduced plasticity and strength of the metal materials, and thus further results in cracking or delayed brittle failure of metallic hydrogen-conveying pipes. Hydrogen embrittlement has little impact on non-metallic pipes which have the advantages of corrosion resistance, vibration resistance, good flexibility and long service life and the like. Hence, the non-metallic pipes are gradually used in the hydrogen conveying field.

SUMMARY

Implementation of the present disclosure provide methods, apparatuses, and systems for testing a hydrogen permeability of a non-metallic pipe, which can solve one or more of the technical problems in the related arts.

One aspect of the present disclosure features an apparatus for testing a hydrogen permeability of a non-metallic pipe, the apparatus includes: pipe sealing pieces configured to seal a to-be-tested pipe; a test cylinder having a hollow cylindrical body for placing the to-be-tested pipe, where a plurality of circumferential reinforcement pieces are disposed on a circumferential inner wall surface of the cylindrical body of the test cylinder and configured to be in contact with an outer surface of the to-be-tested pipe placed in the test cylinder and perform circumferential reinforcement on the to-be-tested pipe, where the test cylinder is configured to, after the to-be-tested pipe is sealed and placed in the hollow cylindrical body of the test cylinder, form sealed test chambers between the outer surface of the to-be-tested pipe and an inner surface of the test cylinder; where the plurality of circumferential reinforcement pieces are provided with vents or grooves to enable the sealed test chambers in communication with each other, and where the test cylinder is further provided with an axial reinforcement piece on at least one side in an axial direction, and the axial reinforcement piece is configured to perform axial reinforcement on the to-be-tested pipe; a high pressure gas source configured to communicate with an interior of the to-be-tested pipe through a gas inlet tube to introduce test gas into the to-be-tested pipe, where the test gas is hydrogen or mixed gas containing hydrogen; a gas exhaust tube configured to communicate with the interior of the to-be-tested pipe to exhaust gas from the to-be-tested pipe; a vacuum pump configured to be connected with the sealed test chambers through a vacuumization tube to extract the gas from the sealed test chambers; and a pressure sensor configured to detect a pressure inside the sealed test chambers.

In the apparatus for testing a hydrogen permeability of a non-metallic pipe according to an embodiment of the present disclosure, the test cylinder includes a hollow cylindrical body assembly and at least one test cylinder sealing piece, where the hollow cylindrical body assembly is provided with an opening on at least one side of the test cylinder in the axial direction, and where the at least one test cylinder sealing piece is configured to, after the to-be-tested pipe is placed in the hollow cylindrical body assembly of the test cylinder, seal the opening of the test cylinder.

In the apparatus for testing a hydrogen permeability of a non-metallic pipe according to an embodiment of the present disclosure, the test cylinder sealing piece is provided with one or more axial adjustment mechanisms to adjust a position of the axial reinforcement piece along the axial direction of the test cylinder.

In the apparatus for testing a hydrogen permeability of a non-metallic pipe according to an embodiment of the present disclosure, at least one of the pipe sealing pieces is provided with a pipe gas inlet and a pipe gas outlet, where the gas inlet tube is in communication with the interior of the to-be-tested pipe through the pipe gas inlet, and where the gas exhaust tube is in communication with the interior of the to-be-tested pipe through the pipe gas outlet.

In the apparatus for testing a hydrogen permeability of a non-metallic pipe according to an embodiment of the present disclosure, the at least one test cylinder sealing piece is provided with a test cylinder gas inlet and a test cylinder gas outlet, where the gas inlet tube is in communication with the interior of the to-be-tested pipe by sequentially passing through the test cylinder gas inlet and the pipe gas inlet, and where the gas exhaust tube is in communication with the interior of the to-be-tested pipe by sequentially passing through the test cylinder gas outlet and the pipe gas outlet.

In the apparatus for testing a hydrogen permeability of a non-metallic pipe according to an embodiment of the present disclosure, the test cylinder includes two half-cylinder assemblies and a sealing piece, where the two half-cylinder assemblies are configured to fit together to form the hollow cylindrical body, and the sealing piece is disposed at a contact surface of at least one of the two half-cylinder assemblies; where the two half-cylinder assemblies are configured to, after the to-be-tested pipe is placed between the two half-cylinder assemblies, fit with each other and realize sealing; and where the test cylinder is provided with one or more axial washers on at least one side of the test cylinder in the axial direction to fill an axial gap between the to-be-tested pipe and the test cylinder and perform axial reinforcement on the to-be-tested pipe.

In the apparatus for testing a hydrogen permeability of a non-metallic pipe according to an embodiment of the present disclosure, the circumferential reinforcement pieces have a size less than $1/10$ of an outer diameter of the to-be-tested pipe along a radial direction of the to-be-tested pipe.

In the apparatus for testing a hydrogen permeability of a non-metallic pipe according to an embodiment of the present disclosure, each of the pipe sealing pieces includes an outer layer and an inner layer, where the outer includes a plastic layer configured to be welded with the to-be-tested pipe to seal the to-be-tested pipe, and the inner layer includes a blocking layer configured to block hydrogen permeation.

In the apparatus for testing a hydrogen permeability of a non-metallic pipe according to an embodiment of the present disclosure, each of the test cylinder and the circumferential reinforcement pieces is provided with a high-strength gas blocking layer in its interior, and where the high-strength gas blocking layer is made of at least one of austenitic stainless steel, low-alloy steel, precipitation strengthened austenitic alloy, or aluminum alloy.

In the apparatus for testing a hydrogen permeability of a non-metallic pipe according to an embodiment of the present disclosure, a temperature controlling apparatus and a temperature sensor are further included, where the temperature controlling apparatus is configured to adjust a temperature in the sealed test chambers, and the temperature sensor is configured to detect the temperature in the sealed test chambers.

In the apparatus for testing a hydrogen permeability of a non-metallic pipe according to an embodiment of the present disclosure, a waste gas recovery apparatus is further included, where the waste gas recovery apparatus is connected respectively with the gas exhaust tube and the vacuumization tube to recover gas exhausted from the to-be-tested pipe and the sealed test chambers.

Another aspect of the present disclosure features a method of testing a hydrogen permeability of a non-metallic pipe, the method includes: communicating a high pressure gas source with an interior of a to-be-tested pipe through a gas inlet tube; communicating a gas exhaust tube with the interior of the to-be-tested pipe; sealing the to-be-tested pipe by pipe sealing pieces; and placing the to-be-tested pipe in a hollow cylindrical body of a test cylinder; sealing the test cylinder to form sealed test chambers between the to-be-tested pipe and the test cylinder by a plurality of circumferential reinforcement pieces disposed on a circumferential inner wall surface of the hollow cylindrical body of the test cylinder and configured to be in contact with an outer surface of the to-be-tested pipe placed in the test cylinder and perform circumferential reinforcement on the to-be-tested pipe, wherein the plurality of circumferential reinforcement pieces are provided with vents or grooves to enable the sealed test chambers in communication with each other, and wherein the test cylinder is further provided with an axial reinforcement piece on at least one side in an axial direction to perform axial reinforcement on the to-be-tested pipe; and connecting a vacuum pump to the sealed test chambers through a vacuumization tube; turning on a high pressure gas source to introduce test gas into the interior of the to-be-tested pipe through the gas inlet tube, where the test gas comprises hydrogen or a mixed gas containing hydrogen; and exhausting gas from the to-be-tested pipe through the gas exhaust tube; controlling the vacuum pump to perform vacuumization on the sealed test chambers through the vacuumization tube; closing the gas exhaust tube and controlling the high pressure gas source to introduce the test gas with a preset pressure into the interior of the to-be-tested pipe through the gas inlet tube; over a predetermined time t, detecting a pressure in the sealed test chambers by a pressure sensor to obtain a pressure detection value $P_0$ in the sealed test chambers; and calculating a hydrogen permeability of the to-be-tested pipe with the pressure detection value $P_0$.

In the method of testing a hydrogen permeability of a non-metallic pipe according to an embodiment of the present disclosure, over the predetermined time t, detecting the pressure in the sealed test chambers by the pressure sensor to obtain the pressure detection value $P_0$ in the sealed test chambers includes: over the predetermined time t, detecting the pressure in the sealed test chambers by the pressure sensor; performing vacuumization treatment on the sealed test chambers by the vacuum pump; repeating detecting the pressure and performing the vacuumization treatment until a change in a detection value of the pressure sensor is less than a preset threshold at a time point; and determining the detection value of the pressure sensor at the time point as the pressure detection value $P_0$ in the sealed test chambers.

In the method of testing a hydrogen permeability of a non-metallic pipe according to an embodiment of the present disclosure, calculating the hydrogen permeability of the to-be-tested pipe with the pressure detection value $P_0$ includes: calculating the hydrogen permeability of the to-be-tested pipe with the pressure detection value $P_0$ based on a formula as follows:

$$J = \frac{P_0 V}{RTL\pi r^2 t}$$

where J represents the hydrogen permeability of the to-be-tested pipe (7) in a unit of $mol/m^2/s$; $P_0$ represents the pressure detection value in the sealed test chambers in a unit of Pa; V represents a volume of the sealed test chambers, in a unit of $m^3$; R is a molar gas constant, valued 8.314472, in a unit of J/mol/K; T is a temperature in the sealed test chambers in a unit of K; L is a length of the to-be-tested pipe in a unit of m; and r is a radius of the to-be-tested pipe in a unit of m.

The additional aspects and advantages of the present disclosure will be set out in the following descriptions and are partially apparent from the following descriptions or understood from the practice of the present disclosure.

Figure 1:
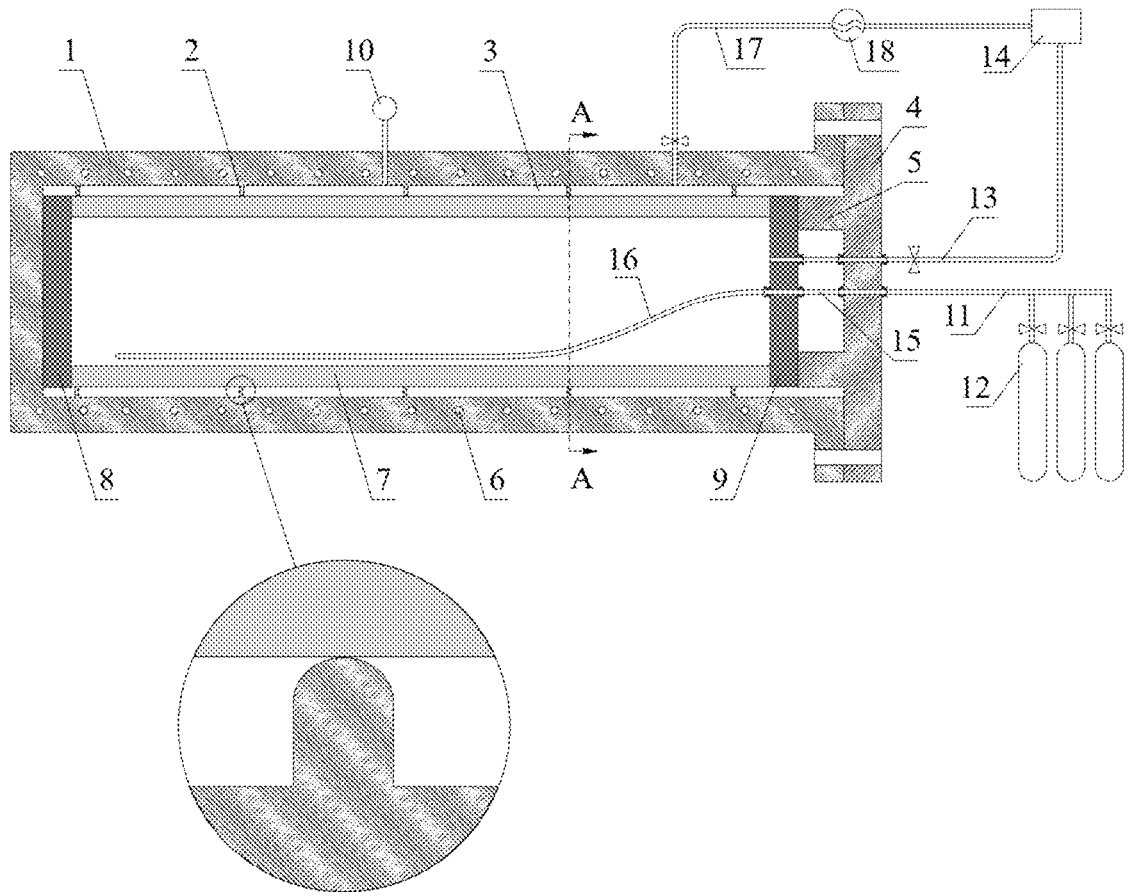
FIG. 1 is a structural schematic diagram illustrating an apparatus for testing a hydrogen permeability of a non-metallic pipe having a sealing piece at a single side according to an embodiment of the present disclosure.

The numerals of the drawings are described below: test cylinder 1, circumferential reinforcement piece 2, vent 21, groove 22, sealed test chamber 3, test cylinder sealing piece 4, test cylinder gas outlet 41, test cylinder gas inlet 42, axial pusher holder 43, axial pusher pad 44, axial reinforcement piece 5, temperature controlling apparatus 6, to-be-tested pipe 7, first pipe sealing piece 8, first pipe sealing piece plastic layer 81, first pipe sealing piece blocking layer 82, second pipe sealing piece 9, second pipe sealing piece plastic layer 91, second pipe sealing piece blocking layer 92, pipe gas outlet 93, pipe gas inlet 94, pressure sensor 10, gas supply tube 11, high pressure gas source 12, gas exhaust tube 13, waste gas recovery apparatus 14, connection tube 15, gas inlet tube 16, vacuumization tube 17, vacuum pump 18, half-cylinder assembly 20, axial washer 23, fastening bolt 24, pressure sensor connection hole 25, and vacuumization tube connection hole 26.

DETAILED DESCRIPTION OF THE EMBODIMENTS

The embodiments of the present disclosure will be set forth in details below with examples illustrated in the drawings, where same or similar numerals represent same or similar elements or elements having same or similar functions. The embodiments described by referring to the accompanying drawings are only illustrative and are intended to explain the present disclosure rather than understood as limiting of the present disclosure.

FIGS. 1 to 11 are schematic diagrams of the embodiments of the present disclosure. But, the specific technical forms involved in the present disclosure may be implemented in other similar ways and are not limited to frame and sequence shown in FIGS. 1 to 11. More precisely, the flow shown in the present disclosure is a better way to fully and thoroughly understand the technical route of the present disclosure in the technical field to which the present disclosure belongs.

Unless otherwise defined in the present disclosure, all technical and scientific terms used in the present disclosure all have the same meaning as those skilled in the art usually understand. The terms used in the contents and implementation route of the present disclosure are only used to better express the specific steps in the technical flow of the present disclosure rather than limited to the meanings of the terms.

If reasonable, the embodiments of the implementations of the present disclosure may be mutually combined.

Due to small molecules and fast diffusion of hydrogen, a non-metallic pipe will be exposed to a higher risk of hydrogen leakage/permeation when used to convey hydrogen. Further, because hydrogen can be ignited with a small energy and has the property of inflammability and explosiveness, accumulation of leaked hydrogen in a confined space will result in an extremely large potential hazard, for example, the leaked hydrogen may bring severe damages to surrounding people and properties upon contacting with open flame. Hence, for the non-metallic hydrogen-conveying pipes in service or newly constructed, hydrogen permeation of these pipes during hydrogen conveyance will produce a series of new technical problems and safety problems. Thus, before actual application of the non-metallic hydrogen-conveying pipes, it is necessary to perform systematic test on the hydrogen permeability of the non-metallic pipes to determine the hydrogen permeability of the non-metallic pipes.

At present, hydrogen permeability test involves the following patent documents: an invention patent CN112763381A entitled "TEST APPARATUS AND TEST METHOD FOR HYDROGEN PERMEABILITY", an invention patent CN113175627A entitled "LEAKAGE MONITORING APPARATUS AND METHOD FOR HYDROGEN-DOPED NATURAL GAS PIPE", an invention patent CN103674808A entitled "FULL-SIZE TEST APPARATUS FOR GAS PERMEABILITY OF NON-METALLIC PIPE", and a utility model patent CN215894320U entitled "FULL-SIZE GAS PERMEABILITY TEST APPARATUS FOR NON-METALLIC COMPOSITE PIPE".

In the above patent documents, a test apparatus and a test method for a gas or hydrogen permeability are disclosed. However, in these documents, the structural properties and hydrogen permeability of the non-metallic pipes are not fully taken into account, which results in the following problems.

(1) Although hydrogen has higher permeability than other gases, its permeation rate is still slow in the non-metallic pipes, which means that a small amount of hydrogen is leaked from the pipes during unit time. In this case, it takes a long time to detect a significant hydrogen concentration or pressure change under normal pressure. Different from the metallic pipes, the non-metallic pipes have a lower bearing strength, and thus the test rate cannot be increased by increasing a hydrogen pressure in the non-metallic pipes. Therefore, at present, it takes a very long time to perform gas permeability test on the non-metallic pipes, thus leading to lower entire test efficiency.

(2) Moreover, the deformation capability of the non-metallic pipes is much higher than that of the metallic pipes. Under an internal pressure, the non-metallic pipes may expand to deform, which reduces the volume of the sealed test chambers at the outer side of the non-metallic pipes. Given a same hydrogen permeation amount, the hydrogen concentration or pressure will be increased due to the reduced volume of the sealed test chambers. In this case, the calculated hydrogen permeability of the non-metallic pipes will be larger.

Implementations of the present disclosure provide techniques for testing a hydrogen permeability of a non-metallic pipe, which can improve the test efficiency and the calculation result accuracy of the hydrogen permeability of the non-metallic pipe.

FIG. 1 is a structural schematic diagram illustrating an apparatus for testing a hydrogen permeability of a non-metallic pipe according to an embodiment of the present disclosure, which is used to perform test on a to-be-tested pipe 7. At the lower part of FIG. 1 is a partially enlarged view of a structure of a circumferential reinforcement piece. As shown in FIG. 1, the present disclosure provides an apparatus for testing a hydrogen permeability of a non-metallic pipe, including a test cylinder 1, circumferential reinforcement pieces 2, sealed test chambers 3, a test cylinder sealing piece 4, an axial reinforcement piece 5, a temperature controlling apparatus 6, pipe sealing pieces 8 and 9, a pressure sensor 10, a gas supply tube 11, a high pressure gas source 12, a gas exhaust tube 13, a waste gas recovery apparatus 14, a connection tube 15, a gas inlet tube 16, a vacuumization tube 17, and a vacuum pump 18.

The pipe sealing pieces 8 and 9 are used to seal the to-be-tested pipe 7. The to-be-tested pipe 7 may be a non-metallic pipe such as a plastic pipe or composite pipe, and may include but not limited to a pipe made from polymer matrices such as polyethylene, high density polyethylene, polypropylene, polyvinyl chloride and polyamide. The to-be-tested pipe 7 may include a conductive filler, for example, include at least one of carbon nanotube, carbon nanofiber, carbon fiber, metal fiber, metal-plated glass fiber, graphene or carbon black. Further, the to-be-tested pipe 7 may further be a metal wire reinforced composite pipe, a glass fiber reinforced composite pipe, or a carbon fiber reinforced composite pipe.

The to-be-tested pipe 7 can have a hollow tubular shape with openings at both sides, and the pipe sealing pieces 8 and 9 may include a first pipe sealing piece 8 and a second pipe sealing piece 9 to seal both ends of the to-be-tested pipe 7.

In an embodiment of the present disclosure, the apparatus for testing a hydrogen permeability of a non-metallic pipe includes the gas exhaust tube 13 in communication with the interior of the to-be-tested pipe 7 to exhaust the gas from the to-be-tested pipe 7. After the to-be-tested pipe 7 is sealed with the pipe sealing pieces 8 and 9, the gas can be exhausted from the to-be-tested pipe 7 through the gas exhaust tube 13.

As shown in FIG. 1, the test cylinder 1 has a hollow cylindrical body for placing the to-be-tested pipe 7. In an embodiment of the present disclosure, the test cylinder 1 includes a hollow cylindrical body assembly and one test cylinder sealing piece 4, the hollow cylindrical body assembly is provided with an opening at one side in an axial direction. The test cylinder sealing piece 4 is configured to, after the to-be-tested pipe 7 is placed in the hollow cylindrical body assembly of the test cylinder 1, seal the opening of the test cylinder 1.

The test cylinder 1 and the test cylinder sealing piece 4 can be made of a high-strength metal material, e.g., a high-strength and hydrogen permeability-resistant metal material such as an austenitic stainless steel, a low-alloy steel, a precipitation strengthened austenitic alloy, an aluminum alloy, or the like.

By referring to FIG. 1, in an embodiment, the test cylinder sealing piece 4 may be a sealing flange which may be fixedly connected with the test cylinder 1 through a fixing structure such as a bolt, so as to seal the opening of the test cylinder 1. In other embodiments, the test cylinder sealing piece 4 may further be connected with the test cylinder 1 by fitting or by a fitting buckle or if necessary, by welding or using an adhesive or the like.

As shown in FIG. 1, a plurality of circumferential reinforcement pieces 2 are disposed on a circumferential inner wall surface of the cylindrical body of the test cylinder 1, and the circumferential reinforcement pieces 2 are configured to be in contact with an outer surface of the to-be-tested pipe 7 placed in the test cylinder 1 and perform circumferential reinforcement on the to-be-tested pipe 7. The circumferential reinforcement pieces 2 may be integrally formed together with the test cylinder 1 or manufactured separately and fixedly mounted on the inner wall surface of the test cylinder 1. A circumferential reinforcement piece 2 can be a support such as a post or a wall. The circumferential reinforcement pieces 2 can be made of a high-strength metal material, e.g., a high-strength and hydrogen permeability-resistant metal material such as an austenitic stainless steel, a low-alloy steel, a precipitation strengthened austenitic alloy, an aluminum alloy, or the like. As shown in the partially enlarged view of FIG. 1, ends of the circumferential reinforcement pieces 2 are smoothly transitioned, so that the circumferential reinforcement pieces 2 can be guaranteed to be in close contact with the to-be-tested pipe 7, thus achieving circumferential reinforcement and circumferential deformation limitation for the to-be-tested pipe. Moreover, after the ends of the circumferential reinforcement pieces 2 are smoothly transitioned, the to-be-tested pipe 7 can be smoothly placed in the test cylinder 1 from the opening side of the test cylinder 1, facilitating mounting of the test apparatus.

As shown in FIG. 1, the plurality of circumferential reinforcement pieces 2 are disposed on the inner wall surface of the test cylinder 1. To effectively perform circumferential reinforcement on the to-be-tested pipe 7 and limit circumferential deformation of the to-be-tested pipe, a distance between adjacent circumferential reinforcement pieces 2 can be set to be the same as a diameter of the to-be-tested pipe, or less than the diameter of the to-be-tested pipe. In the test apparatus of the present disclosure, spiral circumferential reinforcement pieces 2 may be used and the distance between adjacent spiral circumferential reinforcement pieces 2 can be set to be the same as the diameter of the to-be-tested pipe, or less than the diameter of the to-be-tested pipe.

The test cylinder 1 is configured to, after the to-be-tested pipe 7 is sealed and placed in the hollow cylindrical body of the test cylinder 1, form a plurality of sealed test chambers 3 between an outer surface of the to-be-tested pipe 7 and an inner surface of the test cylinder 1. It can be understood that, since the to-be-tested pipe 7 is sealed by the pipe sealing pieces 8 and 9, the internal space of the to-be-tested pipe 7 is spaced apart from the sealed test chambers 3. Further, after the to-be-tested pipe 7 is sealed and placed in the hollow cylindrical body of the test cylinder 1, the gas in the test cylinder 1 is also spaced apart from the external air. Thus, the sealed test chambers 3 are formed between the outer surface of the to-be-tested pipe 7 and the inner surface of the test cylinder 1.

The test cylinder 1 can be sealed in many ways. With reference to FIG. 1, the test cylinder 1 includes a hollow cylindrical body assembly and one test cylinder sealing piece 4, the hollow cylindrical body assembly is provided with an opening at one side in the axial direction. In this embodiment, the test cylinder 1 is sealed at a single side.

The test cylinder 1 is further provided with an axial reinforcement piece on at least one side in the axial direction, and the axial reinforcement piece is configured to perform axial reinforcement on the to-be-tested pipe 7. The axial reinforcement piece 5 may be axial pushers disposed on the test cylinder sealing piece 4 and integrally formed with the test cylinder sealing piece 4.

In an embodiment, the apparatus for testing a hydrogen permeability of a non-metallic pipe according to the present disclosure further includes a temperature controlling apparatus 6 and a temperature sensor, where the temperature controlling apparatus 6 is configured to adjust a temperature in the sealed test chambers 3, and the temperature sensor is configured to detect a temperature in the sealed test chambers 3. The temperature controlling apparatus 6 may be a heating resistance wire 6 which is embedded into the test cylinder 1 and electrically connected with an external heating apparatus to adjust a temperature in the sealed test chambers 3.

The apparatus for testing a hydrogen permeability of a non-metallic pipe according to the present disclosure further includes a pressure sensor 10 configured to detect a pressure in the sealed test chambers 3. In an embodiment, the pressure sensor is an explosion-proof pressure sensor, configured to, in a hydrogen-doped mixed gas environment, monitor, in real time, a pressure in the sealed test chambers 3. In an embodiment, the pressure sensor is a hydrogen pressure sensor configured to, in a hydrogen environment, monitor, in real time, a pressure in the sealed test chambers 3.

The apparatus for testing a hydrogen permeability of a non-metallic pipe according to the present disclosure further includes a high pressure gas source 12 which is in communication with the interior of the to-be-tested pipe 7 through the gas inlet tube 16 to introduce test gas into the to-be-tested pipe 7, where the test gas is hydrogen or a mixed gas containing hydrogen. In an embodiment, as shown in FIG. 1, the high pressure gas source 12 stores a high-pressure hydrogen or mixed gas containing hydrogen. The mixed gas can be a mixed gas of hydrogen, nitrogen and natural gas and the like. The high pressure gas source 12 may be formed by a plurality of high pressure gas storage tanks. Given mixed gas, the plurality of high pressure gas storage tanks may store hydrogen and other gases respectively. Further, the high pressure gas source 12 may further include a gas mixing apparatus which can control the plurality of high pressure gas storage tanks to obtain hydrogen-doped mixed gases of different ratios. The high pressure gas source 12 may be in communication with the interior of the to-be-tested pipe 7 through the gas supply tube 11, the connection tube 15 and the gas inlet tube 16 in sequence.

The apparatus for testing a hydrogen permeability of a non-metallic pipe according to the present disclosure further includes a vacuum pump 18 which is connected with the sealed test chambers 3 through the vacuumization tube 17 to extract the gas from the sealed test chambers 3. In an embodiment of the present disclosure, each of the test cylinder 1 and the circumferential reinforcement pieces 2 includes an outer layer made of a high-strength metal material such as carbon steel, alloy steel, or the like. The outer layer has a high structural strength which ensures the outer layer will not have significant deformation in a case of performing vacuumization for the sealed test chambers 3. Further, each of the test cylinder 1 and the circumferential reinforcement pieces 2 is provided with a high-strength gas blocking layer in its interior, and a material of which at least includes one or more of austenitic stainless steel, low-alloy steel, precipitation strengthened austenitic alloy or aluminum alloy.

In an embodiment, the apparatus for testing a hydrogen permeability of a non-metallic pipe according to the present disclosure further includes a waste gas recovery apparatus 14, where the waste gas recovery apparatus 14 is connected respectively with the gas exhaust tube 13 and the vacuumization tube 17 to recover the gas exhausted from the to-be-tested pipe 7 and the sealed test chambers 3.

In an embodiment, the test cylinder sealing piece 4 and the pipe sealing pieces 8 and 9 are provided with a plurality of vents for the gas supply tube 11, the gas exhaust tube 13, the connection tube 15 and the gas inlet tube 16 and the vacuumization tube 17 to pass through. In some cases, after the above tubes are mounted, sealing is performed between the vents and the tubes by sealing pieces.

Figure 2:
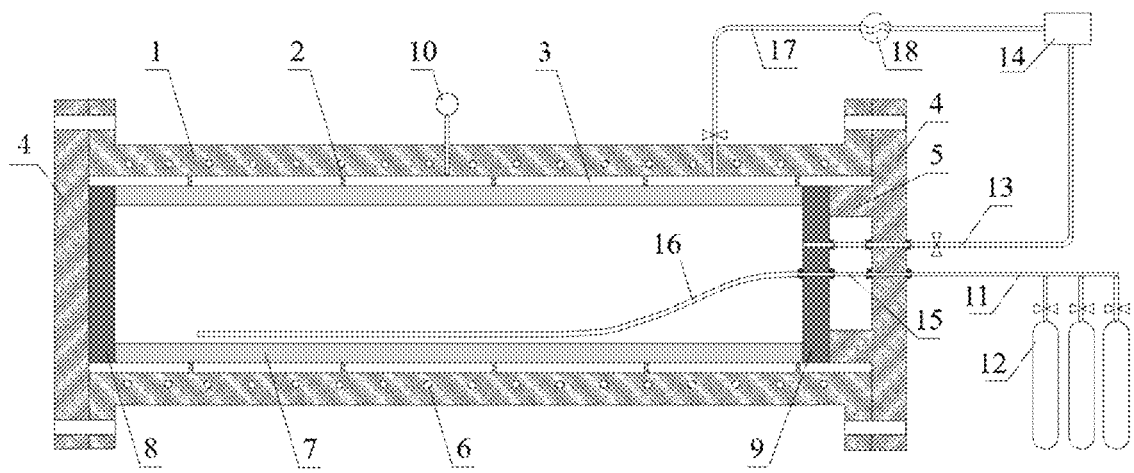
FIG. 2 is a structural schematic diagram illustrating an apparatus for testing a hydrogen permeability of a non-metallic pipe having sealing pieces at double sides according to another embodiment of the present disclosure.

FIG. 2 is a structural schematic diagram illustrating an apparatus for testing a hydrogen permeability of a non-metallic pipe having sealing pieces at double sides according to another embodiment of the present disclosure. As shown in FIG. 2, in another embodiment of the present disclosure, the test cylinder 1 includes a hollow cylindrical body assembly and two test cylinder sealing pieces 4, the hollow cylindrical body assembly is provided with openings on at least two sides in the axial direction. The two test cylinder sealing pieces 4 are configured to, after the to-be-tested pipe 7 is placed in the hollow cylindrical body assembly of the test cylinder 1, seal the openings of the test cylinder 1. Those skilled in the art can understand that, in the present embodiment, other structures are basically same as or similar to the embodiment of FIG. 1 and thus relevant descriptions are not repeated herein.

Figure 3:
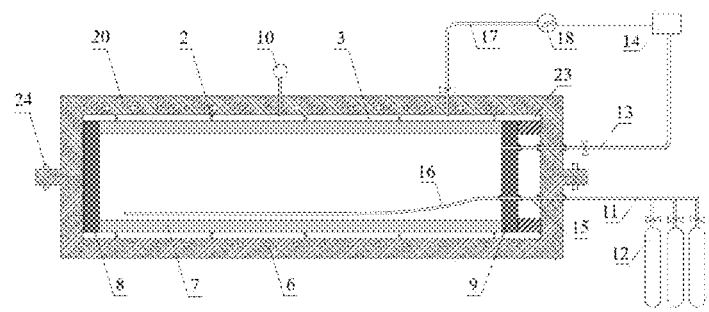
FIGS. 3 (*a*) to 3 (*c*) are structural schematic diagrams illustrating a split type apparatus for testing a hydrogen permeability of a non-metallic pipe according to another embodiment of the present disclosure, where FIG. 3 (*a*) is a sectional view of the split type apparatus for testing a hydrogen permeability of a non-metallic pipe, FIG. 3 (*b*) is a left view of the split type apparatus, and FIG. 3 (*c*) is a top view of the split type apparatus.
Figure 3:
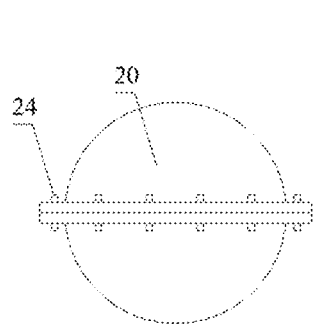
Figure 3:
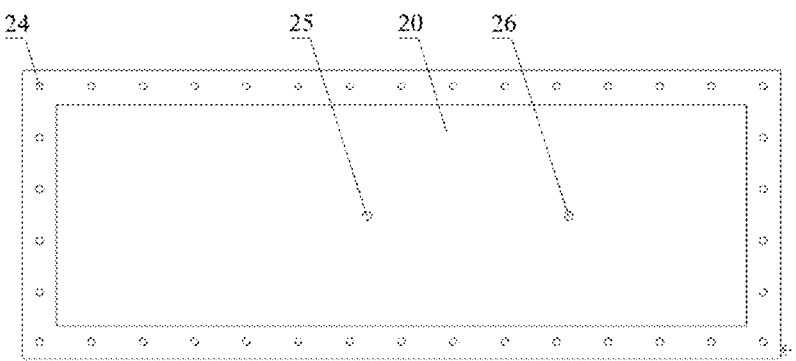

FIGS. 3(a) to 3(c) are structural schematic diagrams illustrating a split type apparatus for testing a hydrogen permeability of a non-metallic pipe according to another embodiment of the present disclosure, where FIG. 3 (a) is a sectional view of the split type apparatus for testing a hydrogen permeability of a non-metallic pipe, FIG. 3 (b) is a left view of the split type apparatus, and FIG. 3 (c) is a top view of the split type apparatus. By referring to FIGS. 3 (a) to 3(c), in this embodiment, the test cylinder 1 is a split type test cylinder, including two half-cylinder assemblies 20 and a sealing piece (e.g., a sealing pad made of rubber), the two half-cylinder assemblies are configured to fit together to form the hollow cylindrical body, and the sealing piece is disposed at a contact surface of at least one of the half-cylinder assemblies 20. The two half-cylinder assemblies 20 are configured to, after the to-be-tested pipe 7 is placed between the two half-cylinder assemblies, fit with each other and realize sealing. In the present embodiment, the two half-cylinder assemblies 20 can be fitted together by fastening bolts 24. In other embodiments, the two half-cylinder assemblies 20 can further be fitted together by fitting or by a fitting buckle or the like. Further, the half-cylinder assemblies 20 are provided with a pressure sensor connection hole 25 and a vacuumization tube connection hole 26, and the pressure sensor 10 and the vacuumization tube 17 can be inserted into the sealed test chambers 3 through the pressure sensor connection hole 25 and the vacuumization tube connection hole 26 respectively. Those skilled in the art should understand that in the present embodiment, other structures are basically same as or similar to the embodiment of FIG. 1 and thus relevant descriptions are not repeated herein.

Although three sealing manners of the test cylinder 1 are shown as in FIGS. 1 to 3, those skilled in the art may understand that these sealing manners are only specific choices for sealing and those skilled in the art may also use other known sealing manners of the test cylinder. Further, regardless of the types of the sealing manners, a sealing ring or sealing strip may be used at each joint to further guarantee the sealing effect.

Figure 4:
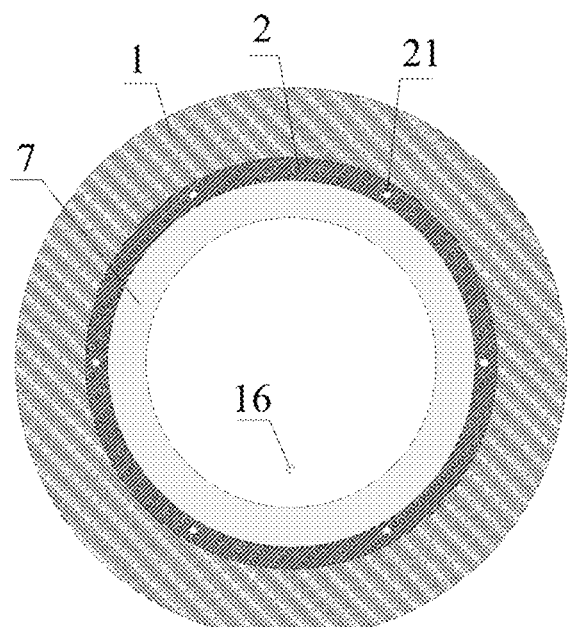
FIG. 4 is a structural schematic diagram of the A-A section in FIG. 1 according to an embodiment of the present disclosure.
Figure 5:
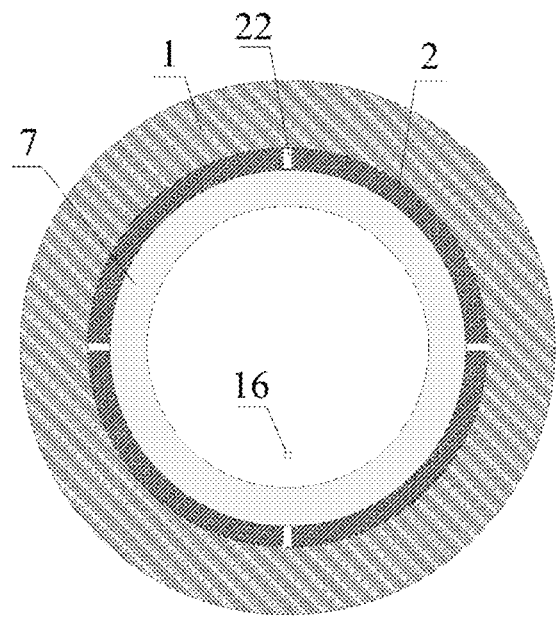
FIG. 5 is a structural schematic diagram of the A-A section in FIG. 1 according to another embodiment of the present disclosure.

FIG. 4 is a structural schematic diagram of the A-A section in FIG. 1 according to an embodiment of the present disclosure. FIG. 5 is a structural schematic diagram of the A-A section in FIG. 1 according to another embodiment of the present disclosure. As shown in FIGS. 4 and 5, in an embodiment of the present disclosure, the circumferential reinforcement pieces 2 are provided with vents 21 or grooves 22 to enable the plurality of sealed test chambers 3 in communication with each other, so that the gas in the sealed test chambers 3 will not be partitioned into a plurality of gas chambers by the circumferential reinforcement pieces 2. In some examples, the circumferential reinforcement pieces 2 have a size less than 1/10 of an outer diameter of the to-be-tested pipe 7 along a radial direction of the to-betested pipe 7. With the above configuration of the circumferential reinforcement pieces 2, the volume of the sealed test chambers 3 can be not too large, and thus a concentration of hydrogen permeating into the chambers in the unit time can be increased, so as to improve the detection accuracy and efficiency.

Figure 6:
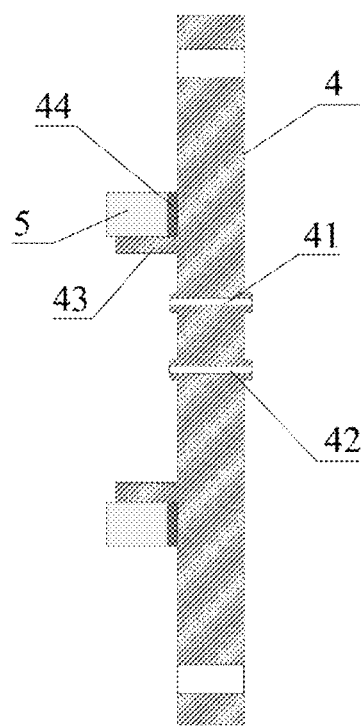
FIG. 6 is a structural schematic diagram illustrating a test cylinder sealing piece according to an embodiment of the present disclosure.
Figure 7:
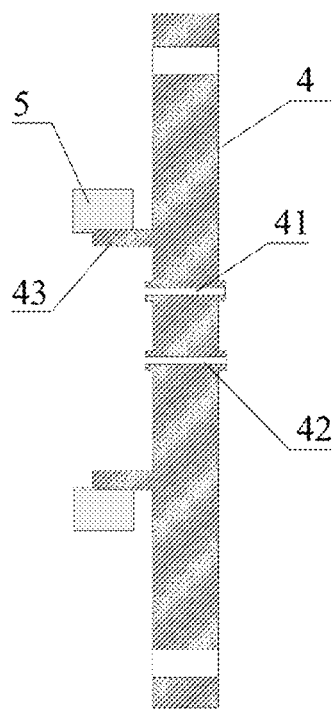
FIG. 7 is a structural schematic diagram illustrating a test cylinder sealing piece according to another embodiment of the present disclosure.

FIG. 6 is a structural schematic diagram illustrating a test cylinder sealing piece according to an embodiment of the present disclosure. FIG. 7 is a structural schematic diagram illustrating a test cylinder sealing piece according to another embodiment of the present disclosure. As shown in FIGS. 6 and 7, the test cylinder 1 is further provided with an axial reinforcement piece 5 on at least one side of the test cylinder 1 in the axial direction and the axial reinforcement piece is configured to perform axial reinforcement on the to-be-tested pipe 7. The axial reinforcement piece 5 may be axial pushers disposed on the test cylinder sealing piece 4 and integrally formed with the test cylinder sealing piece 4. The test cylinder sealing piece 4 is provided with one or more axial adjustment mechanisms to adjust the position of the axial reinforcement piece 5 along the axial direction of the test cylinder 1. In the embodiment shown in FIG. 3, the axial adjustment mechanism may be an axial washer 23. In the embodiments shown in FIGS. 1 to 2, the axial adjustment mechanism may be a combination of an axial pusher holder 43 and an axial pusher pad 44. With the above structure, the position of the axial reinforcement piece 5 along the axial direction of the test cylinder 1 can be adjusted correspondingly according to different lengths of the to-be-tested pipe 7. The axial pusher holder 43 can be integrally formed with the test cylinder sealing piece 4, or separately manufactured and fixedly mounted on the test cylinder sealing piece 4.

In an embodiment, the test cylinder sealing piece 4 is provided with a test cylinder gas inlet 42 and a test cylinder gas outlet 41. The gas inlet tube 16 is in communication with the interior of the to-be-tested pipe 7 by sequentially passing through the test cylinder gas inlet 42 and the pipe gas inlet 94, and the gas exhaust tube 13 is in communication with the interior of the to-be-tested pipe 7 by sequentially passing through the test cylinder gas outlet 41 and the pipe gas outlet 93.

Figure 8:
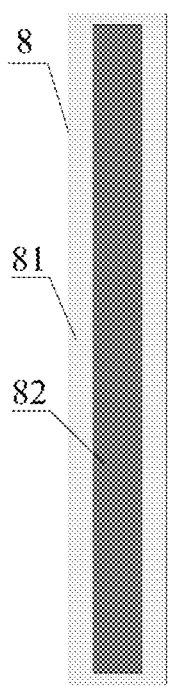
FIG. 8 is a structural schematic diagram illustrating a pipe sealing piece according to an embodiment of the present disclosure.
Figure 9:
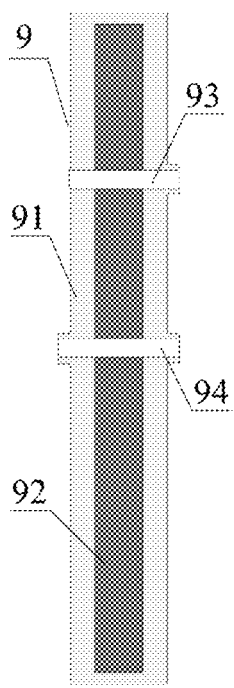
FIG. 9 is a structural schematic diagram illustrating a pipe sealing piece according to another embodiment of the present disclosure.

FIG. 8 is a structural schematic diagram illustrating a pipe sealing piece according to an embodiment of the present disclosure. FIG. 9 is a structural schematic diagram illustrating a pipe sealing piece according to another embodiment of the present disclosure. As shown in FIGS. 8 and 9, in an embodiment of the present disclosure, each of the pipe sealing pieces 8 and 9 includes an outer layer and an inner layer, where the outer layer is a plastic layer to be welded with the to-be-tested pipe 7 and seal the to-be-tested pipe 7, and the inner layer is a blocking layer to block hydrogen permeation. In an embodiment, the first pipe sealing piece 8 includes a first pipe sealing piece plastic layer 81 and a first pipe sealing piece blocking layer 82 as shown in FIG. 8; the second pipe sealing piece 9 includes a second pipe sealing piece plastic layer 91 and a second pipe sealing piece blocking layer 92. In some embodiments, the outer plastic layer is made of the same material as the to-be-tested pipe 7; the inner blocking layer can be a high-strength and hydrogen permeation-resistant metal material such as an austenitic stainless steel, a low-alloy steel, a precipitation strengthened austenitic alloy, or an aluminum alloy and the like.

As shown in FIG. 9, the second pipe sealing piece 9 is provided with a pipe gas outlet 93 and a pipe gas inlet 94. The gas inlet tube 16 is in communication with the interior of the to-be-tested pipe 7 through the pipe gas inlet 94, and the gas exhaust tube 13 is in communication with the interior of the to-be-tested pipe 7 through the pipe gas outlet 93.

The present disclosure further provides a method of testing a hydrogen permeability of a non-metallic pipe, which is performed by the above apparatus for testing a hydrogen permeability of a non-metallic pipe in the following steps S1 to S5.

At step S1, the high pressure gas source 12 is communicated with the interior of the to-be-tested pipe 7 through the gas inlet tube 16, the gas exhaust tube 13 is communicated with the interior of the to-be-tested pipe 7, and the to-be-tested pipe 7 is sealed with the pipe sealing pieces 8 and 9 and placed in the hollow cylindrical body of the test cylinder 1.

At step S2, the test cylinder 1 is sealed to form the sealed test chambers 3 between the to-be-tested pipe 7 and the test cylinder 1, and the vacuum pump 18 is connected with the sealed test chambers 3 through the vacuumization tube 17.

At step S3, the high pressure gas source 12 is turned on to introduce test gas into the interior of the to-be-tested pipe 7 through the gas inlet tube 16, and gas is exhausted from the to-be-tested pipe 7 through the gas exhaust tube 13; and the vacuum pump 18 is controlled to perform vacuumization on the sealed test chambers 3 through the vacuumization tube 17. Performing step S3 is to purge/remove air in the to-be-tested pipe 7 so as to ensure that gas in the to-be-tested pipe 7 are the gas to be tested.

At step S4, the gas exhaust tube 13 is closed and the high pressure gas source 12 is controlled to introduce a high pressure test gas with a preset pressure into the interior of the to-be-tested pipe 7 through the gas inlet tube 16. The high pressure test gas at step S4 has same composition as the test gas at step S3 but with a higher pressure than the test gas at step S3. For example, the test gas at step S3 can have a pressure lower than 0.2 MPa, and the high pressure test gas at step S4 can have a pressure of no lower than 1 MPa as the preset pressure, e.g., 1 MPa, 1.5 MPa, 2 MPa, 2.5 MPa or higher.

At step S5, over a predetermined time t, a pressure in the sealed test chambers 3 is detected by the pressure sensor 10 to obtain a pressure detection value $P_0$ in the sealed test chambers 3.

At step S6, a hydrogen permeability of the to-be-tested pipe 7 is calculated with the pressure detection value $P_0$.

In the method of testing a hydrogen permeability of a non-metallic pipe according to the present disclosure, the step S5 may further include steps S51 to S53.

At step S51, over the predetermined time t, the pressure in the sealed test chambers 3 is detected by the pressure sensor 10.

At step S52, vacuumization treatment is performed on the sealed test chambers 3 by the vacuum pump 18.

At step S53, the above steps S51 to S52 are repeated until a change in a detection value of the pressure sensor 10 is less than a preset threshold at a time point, and the detection value of the pressure sensor 10 at the time point is determined as the pressure detection value $P_0$ in the sealed test chambers 3.

Figure 10:
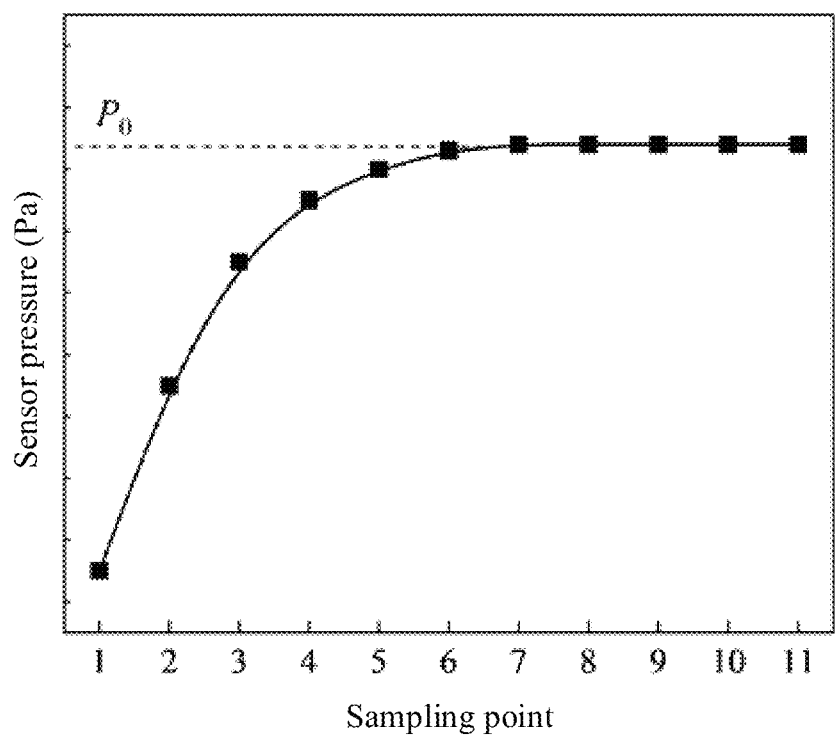
FIG. 10 is a sensor pressure curve obtained through several samplings in a method of testing a hydrogen permeability of a non-metallic pipe according to an embodiment of the present disclosure.

FIG. 10 is a sensor pressure curve obtained through several samplings in a method of testing a hydrogen permeability of a non-metallic pipe according to an embodiment of the present disclosure. As shown in FIG. 10, in the first to seventh detections, a change in the detection value of the pressure sensor 10 is gradually from large to small; after the test steps are repeated, in the eighth sampling, the pressure detection value of the sensor no longer changes much. In the present embodiment, it is considered that in the eighth detection, the change in the detection value of the pressure sensor 10 is less than the preset threshold at a time point, and the detection value at the time point is determined as the pressure detection value $P_0$ in the sealed test chambers 3.

In a method of testing a hydrogen permeability of a non-metallic pipe according to an embodiment of the present disclosure, the hydrogen permeability of the to-be-tested pipe 7 is calculated based on a formula as follows:

$$J = \frac{P_0 V}{RTL\pi r^2 t},$$

where J represents the hydrogen permeability of the to-be-tested pipe 7 in the unit of $mol/m^2/s$; $P_0$ represents the pressure detection value in the sealed test chambers 3 in the unit of Pa; V represents a volume of the sealed test chambers 3 in the unit of $m^3$; R is a molar gas constant, valued 8.314472, in the unit of J/mol/K; T is a temperature in the sealed test chambers in the unit of K; L is a length of the to-be-tested pipe 7 in the unit of m; r is a radius of the to-be-tested pipe 7 in the unit of m.

Further descriptions are made through an implementation example of the present disclosure in an actual application scenario. Through experiments, it is found that compared with the test method in the prior art, the technical solution of the present disclosure can greatly improve the test rate.

Embodiment 1

For example, a high density polyethylene pipe with a diameter of 250 mm and a diameter-to-thickness ratio of 11 (i.e., the wall thickness of the pipe is 22.7 mm) is taken as a to-be-tested pipe. The to-be-tested pipe is connected with the pipe sealing pieces by hot melt. The pipe sealing pieces are internally provided with a stainless steel reinforced layer to effectively block permeation of hydrogen from the pipe sealing pieces.

If the to-be-tested pipe is not reinforced with the circumferential reinforcement pieces and the axial reinforcement piece(s), a lower internal pressure is applied to the to-be-tested pipe during test. Usually, it is considered that the high density polyethylene to-be-tested pipe may deform when the internal pressure exceeds 1 MPa, thus leading to a test accuracy deviation. When the internal pressure applied to the to-be-tested pipe is 1 MPa, the following data can be found from the documents: at the temperature of 25° C., the solubility S of hydrogen in the high density polyethylene is $4.3 \times 10^{-6}$ mol/($m^3$·Pa) and the diffusion coefficient D of hydrogen is $2.220 \times 10^{-10}$ $m^2/s$. According to Fick's first and second laws, the concentration of hydrogen along a wall thickness direction of the pipe can be calculated in the formula as follows:

$$\frac{\partial c}{\partial t} = D\left(\frac{\partial^2 c}{\partial r^2} + \frac{1}{r}\frac{\partial c}{\partial r}\right) \quad (1)$$

where c represents a hydrogen concentration ($mol/m^3$), t represents a diffusion time, r represents a radial distance of the to-be-tested pipe (between an inner diameter and an outer diameter), which may be 102.3 to 125 mm.

Figure 11:
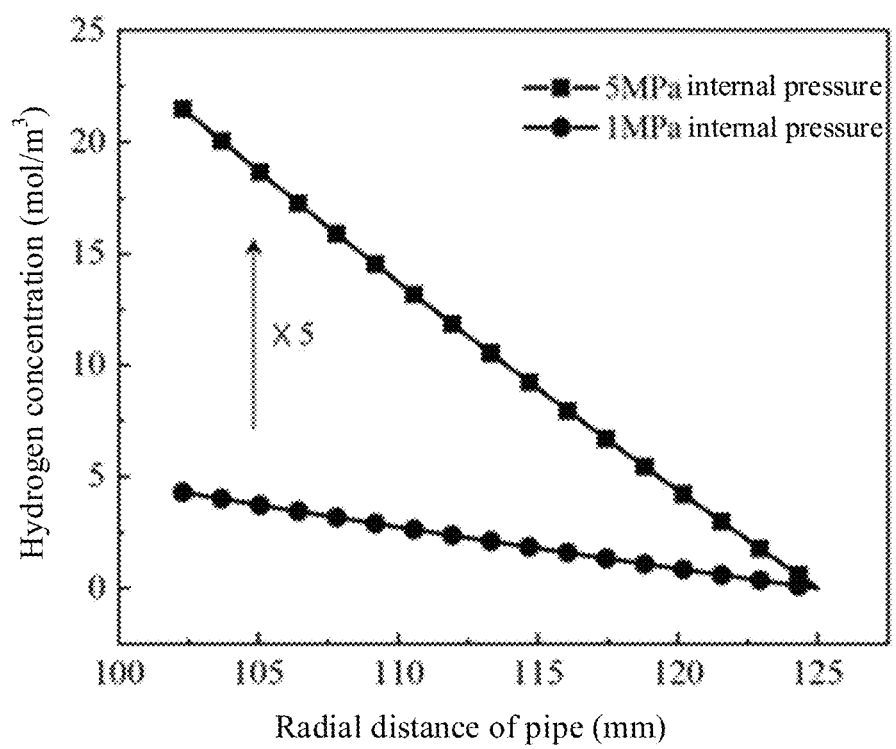
FIG. 11 is a curve showing a relationship between a hydrogen concentration and a pipe radial distance under different pressures in a method of testing a hydrogen permeability of a non-metallic pipe according to an embodiment of the present disclosure.

Based on the above calculation, the concentrations along the wall thickness direction of the pipe at the time of the permeation of hydrogen being balanced are distributed as the curve at the lower part of FIG. 11.

After the pipe is reinforced with the circumferential reinforcement pieces and the axial reinforcement piece(s) in the present disclosure, a hydrogen pressure far greater than the bearing strength of the pipe can be applied to the pipe. The team of the inventor found that with use of the apparatus of the present disclosure, in a case of an internal pressure of 5MPa applied to the to-be-tested pipe, the test deviation resulting from the deformation of the to-be-tested pipe is still within an acceptable error range.

Based on the above calculation, the concentrations along the wall thickness direction of the pipe at the time of the permeation of hydrogen being balanced are distributed as the curve at the upper part of FIG. 11.

FIG. 11 is a curve showing a relationship between a hydrogen concentration and a pipe radial distance under different pressures in a method of testing a hydrogen permeability of a non-metallic pipe according to an embodiment of the present disclosure. As shown in FIG. 11, after the internal pressure is increased, the concentration of hydrogen is greatly increased. After the hydrogen test pressure is five times the original pressure, the hydrogen concentration in the pipe is also five times the original concentration.

According to Fick's first law, the amount Q of hydrogen permeating from the outer surface of the pipe in the unit time is:

$$Q = -D \cdot \frac{\partial c}{\partial r} \cdot 2\pi rL \quad (2)$$

where $$\frac{\partial c}{\partial r}$$

represents a slope of the hydrogen concentration change curve at the position of the radius r.

When the internal pressure in the hydrogen test is five times the original pressure, the concentration of hydrogen is five times the original concentration and a value of $$\frac{\partial c}{\partial r}$$

is also five times the original value. It can be seen therefrom that, after the test pressure is increased, the amount of hydrogen permeating from the pipe in the unit time is increased. Therefore, the pressure sensor 10 can detect a significant pressure change in the sealed test chambers 3 within a short time, thus increasing the test efficiency. For example, under the internal pressure 1 MPa of the hydrogen test, it takes 10 hours for the pressure sensor to detect a significant pressure change. After use of the test apparatus and test method of the present disclosure, the hydrogen test pressure can be increased to 5 MPa without affecting detection accuracy. In this case, it takes only two hours to detect a significant pressure change. Thus, compared with the prior art, the test rate of the present disclosure is increased to be five times.

Compared with the related arts, one or more technical solutions of the embodiments of the present disclosure at least have the following technical effects or advantages.

(1) In an embodiment of the present disclosure, the to-be-tested pipe is circumferentially reinforced by the circumferential reinforcement pieces of the test cylinder and axially reinforced by the axial reinforcement piece(s) of the test cylinder. Hence, in a test, a hydrogen pressure far greater than the bearing strength of the pipe can be applied to the pipe. In this case, the hydrogen amount permeating into the sealed test chambers in the unit time is greatly increased, and thus the pressure sensor can detect a significant hydrogen pressure change within a short time, increasing the test efficiency.

(2) In an embodiment of the present disclosure, the circumferential deformation of the to-be-test pipe is limited by the circumferential reinforcement pieces of the test cylinder and the axial deformation of the to-be-tested pipe is limited by the axial reinforcement piece(s) of the test cylinder. Hence, it is ensured that the volume of the sealed test chambers maintains unchanged before and after the to-be-tested pipe is applied with a high pressure, thus eliminating the influence of the deformation of the pipe on the calculation result, and making the calculated hydrogen permeability result of the pipe more accurate.

(3) In an embodiment, in the test method of the present disclosure, full consideration is given to that hydrogen in the initial permeation stage of the pipe is in a non-steady state and that the amount of hydrogen in the non-steady state permeating into the pipe in the unit time is gradually increased. In the test method of the present disclosure, the data of the pressure sensor is collected several times and the sealed test chambers are re-vacuumized so as to accurately determine whether the hydrogen permeation is balanced, thus obtaining more accurate test data.

It is to be noted that logics and/or steps represented or described another way in the flowchart, for example, may be considered as a sequence list of executable instructions for implementing logical functions and can be specifically implemented in any computer readable medium for use by the instruction executing systems, apparatuses or devices (e.g. a computer-based system, a system including a processor, or another system for obtaining and executing instructions from the instruction executing systems, apparatuses or devices), or use in combination with these instruction executing systems, apparatuses or devices. In the specification, "computer readable medium" may be any apparatus capable of containing, storing, communicating, disseminating or transmitting programs for use by the instruction executing systems, apparatuses or devices or use in combination with the instruction executing systems, apparatuses or devices. The more specific examples of the computer readable medium (non-exhaustive list) include: an electrically-connected part having one or more wires (electronic apparatus), a portable computer cassette (magnetic apparatus), a random access memory (RAM), a read only memory (ROM), an erasable programmable read-only memory (EPROM or flash memory), an optical fiber apparatus, and a portable compact disk ROM (CDROM). Furthermore, the computer readable medium may even be a paper or another proper medium on which programs are printed because, for example, optical scan can be performed on the paper or another medium and then edited, interpreted or if necessary, processed in another proper way to electronically obtain the programs and then store the programs in the computer memory.

It should be understood that, each part of the present disclosure can be implemented by hardware, software, firmware or a combination thereof. In the above embodiments, multiple steps or methods may be implemented by a software or a firmware stored in the memory and executable by a proper instruction executing system. For example, if they are implemented by a hardware, as in another embodiment, they can be implemented by any one of the following technologies well known in the field or a combination thereof: a discrete logic circuit having a logic gate circuit for implementing logic functions for data signals, a dedicated integrated circuit having a proper combination logic gate circuit, a programmable gate array (PGA), a field programmable gate array (FPGA) and the like.

In the descriptions of the specification, the reference terms "one embodiment", "preferred embodiment", "example" "specific example" or "some examples" or the like are intended to mean specific features, structures, material or characteristics described in combination with the embodiment or the example are included in at least one embodiment or example of the present disclosure. In the specification, the illustrative expressions of the above terms do not necessarily refer to same embodiments or examples. Further, the described specific features, structures, materials, or characteristics may be combined in a proper way in one or more embodiments or examples.

In the descriptions of the present disclosure, it is understood that orientation or positional relationship indicated by the terms such as "central", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", and "circumferential" is based on the orientation or positional relationship shown in drawings and used only for ease of descriptions and simplification of descriptions rather than indicate or imply that the indicated devices or elements must have a particular orientation, or be constructed or operated in a particular orientation. Therefore, such terms shall not be understood as limiting of the present disclosure.

Further, the terms "first" and "second" used in the embodiments of the present disclosure are used for descriptions only and shall not be understood as indicating or implying relative importance or implicitly indicating the number of the features indicated in the embodiments. As a result, the features defined by "first" and "second" in the embodiments of the present disclosure may explicitly or implicitly include at least one of the features. In the descriptions of the present disclosure, the term "several" has the meaning of at least two, for example, two or three, or four or the like, unless otherwise clearly stated.

In the present disclosure, unless otherwise clearly stated or defined, the terms "mount", "connect", "couple", and "fix" and the like in the embodiments shall be understood in a broad sense, for example, may be fixed connection, or detachable connection, or formed into one piece; or may be mechanical connection, or electrical connection; or direct connection or indirect connection through an intermediate medium, or may be internal communication between two elements or mutual interaction of two elements. Those skilled in the art may understand the specific meanings of the above terms in the present disclosure according to actual situations.

In the present disclosure, unless otherwise clearly stated or defined, the first feature being "on" or "below" the second feature refers to that the first feature and the second feature are in direct contact, or the first feature and the second feature are in indirect contact through an intermediate medium. Furthermore, the first feature being "above" or "on" the second feature refers to that the first feature is exactly over or obliquely above the second feature, or only refers to that the first feature has a higher horizontal height than the second feature. The first feature being "under" or "below" the second feature refers to that the first feature is exactly under or obliquely below the second feature, or only refers to that the first feature has a smaller horizontal height than the second feature.

Although the embodiments of the present disclosure are already illustrated and described above, it can be understood that the above embodiments are only illustrative and shall not be understood as limiting of the present disclosure. Those skilled in the art can make changes, modifications, replacements or variations to the above embodiments within the scope of the present disclosure.

The invention claimed is:

1. An apparatus for testing a hydrogen permeability of a non-metallic pipe, the apparatus comprising:
pipe sealing pieces configured to seal a to-be-tested pipe;
a test cylinder having a hollow cylindrical body for placing the to-be-tested pipe, wherein a plurality of circumferential reinforcement pieces are disposed on a circumferential inner wall surface of the cylindrical body of the test cylinder and configured to be in contact with an outer surface of the to-be-tested pipe placed in the test cylinder and perform circumferential reinforcement on the to-be-tested pipe,
wherein the test cylinder is configured to, after the to-be-tested pipe is sealed and placed in the hollow cylindrical body of the test cylinder, form sealed test chambers between the outer surface of the to-be-tested pipe and an inner surface of the test cylinder,
wherein the plurality of circumferential reinforcement pieces are provided with vents or grooves to enable the sealed test chambers in communication with each other, and
wherein the test cylinder is further provided with an axial reinforcement piece on at least one side in an axial direction, and the axial reinforcement piece is configured to perform axial reinforcement on the to-be-tested pipe;
a high pressure gas source configured to communicate with an interior of the to-be-tested pipe through a gas inlet tube to introduce test gas into the to-be-tested pipe, wherein the test gas is hydrogen or a mixed gas containing hydrogen;
a gas exhaust tube configured to communicate with the interior of the to-be-tested pipe to exhaust gas from the to-be-tested pipe;
a vacuum pump configured to be connected with the sealed test chambers through a vacuumization tube to extract the gas from the sealed test chambers; and
a pressure sensor configured to detect a pressure inside the sealed test chambers.

2. The apparatus of claim 1, wherein the test cylinder comprises:
a hollow cylindrical body assembly; and
at least one test cylinder sealing piece,
wherein the hollow cylindrical body assembly is provided with an opening on at least one side of the test cylinder in the axial direction, and
wherein the at least one test cylinder sealing piece is configured to, after the to-be-tested pipe is placed in the hollow cylindrical body assembly of the test cylinder, seal the opening of the test cylinder.

3. The apparatus of claim 2, wherein the test cylinder sealing piece is provided with one or more axial adjustment mechanisms to adjust a position of the axial reinforcement piece along the axial direction of the test cylinder.

4. The apparatus of claim 2, wherein at least one of the pipe sealing pieces is provided with a pipe gas inlet and a pipe gas outlet,
wherein the gas inlet tube is in communication with the interior of the to-be-tested pipe through the pipe gas inlet, and
wherein the gas exhaust tube is in communication with the interior of the to-be-tested pipe through the pipe gas outlet.

5. The apparatus of claim 4, wherein the at least one test cylinder sealing piece is provided with a test cylinder gas inlet and a test cylinder gas outlet,
wherein the gas inlet tube is in communication with the interior of the to-be-tested pipe by sequentially passing through the test cylinder gas inlet and the pipe gas inlet, and
wherein the gas exhaust tube is in communication with the interior of the to-be-tested pipe by sequentially passing through the test cylinder gas outlet and the pipe gas outlet.

6. The apparatus of claim 1, wherein the test cylinder comprises:
two half-cylinder assemblies; and
a sealing piece,
wherein the two half-cylinder assemblies are configured to fit together to form the hollow cylindrical body, and the sealing piece is disposed at a contact surface of at least one of the two half-cylinder assemblies,
wherein the two half-cylinder assemblies are configured to, after the to-be-tested pipe is placed between the two half-cylinder assemblies, fit with each other and realize sealing, and
wherein the test cylinder is provided with one or more axial washers on at least one side of the test cylinder in the axial direction to fill an axial gap between the to-be-tested pipe and the test cylinder and perform axial reinforcement on the to-be-tested pipe.

7. The apparatus of claim 1, wherein the circumferential reinforcement pieces have a size less than $\frac{1}{10}$ of an outer diameter of the to-be-tested pipe along a radial direction of the to-be-tested pipe.

8. The apparatus of claim 1, wherein each of the pipe sealing pieces comprises:
an outer layer comprising a plastic layer configured to be welded with the to-be-tested pipe to seal the to-be-tested pipe; and
an inner layer comprising a blocking layer configured to block hydrogen permeation.

9. The apparatus of claim 1, wherein each of the test cylinder and the circumferential reinforcement pieces is provided with a high-strength gas blocking layer in its interior, and
wherein the high-strength gas blocking layer is made of at least one of austenitic stainless steel, low-alloy steel, precipitation strengthened austenitic alloy, or aluminum alloy.

10. The apparatus of claim 1, further comprising:
a temperature controlling apparatus configured to adjust a temperature in the sealed test chambers, and
a temperature sensor configured to detect the temperature in the sealed test chambers.

11. The apparatus of claim 1, further comprising a waste gas recovery apparatus,
wherein the waste gas recovery apparatus is connected respectively with the gas exhaust tube and the vacuumization tube to recover gas exhausted from the to-be-tested pipe and the sealed test chambers.

12. A method of testing a hydrogen permeability of a non-metallic pipe, the method comprising:
communicating a high pressure gas source with an interior of a to-be-tested pipe through a gas inlet tube;
communicating a gas exhaust tube with the interior of the to-be-tested pipe;
sealing the to-be-tested pipe by pipe sealing pieces;
placing the to-be-tested pipe in a hollow cylindrical body of a test cylinder;
sealing the test cylinder to form sealed test chambers between the to-be-tested pipe and the test cylinder by a plurality of circumferential reinforcement pieces disposed on a circumferential inner wall surface of the hollow cylindrical body of the test cylinder and configured to be in contact with an outer surface of the to-be-tested pipe placed in the test cylinder and perform circumferential reinforcement on the to-be-tested pipe, wherein the plurality of circumferential reinforcement pieces are provided with vents or grooves to enable the sealed test chambers in communication with each other, and wherein the test cylinder is further provided with an axial reinforcement piece on at least one side in an axial direction to perform axial reinforcement on the to-be-tested pipe;
connecting a vacuum pump to the sealed test chambers through a vacuumization tube;
turning on a high pressure gas source to introduce test gas into the interior of the to-be-tested pipe through the gas inlet tube, wherein the test gas comprises hydrogen or a mixed gas containing hydrogen;
exhausting gas from the to-be-tested pipe through the gas exhaust tube;
controlling the vacuum pump to perform vacuumization on the sealed test chambers through the vacuumization tube;
closing the gas exhaust tube;
controlling the high pressure gas source to introduce the test gas with a preset pressure into the interior of the to-be-tested pipe through the gas inlet tube;
over a predetermined time t, detecting a pressure in the sealed test chambers by a pressure sensor to obtain a pressure detection value $P_0$ in the sealed test chambers; and
calculating a hydrogen permeability of the to-be-tested pipe with the pressure detection value $P_0$.

13. The method of claim 12, wherein, over the predetermined time t, detecting the pressure in the sealed test chambers by the pressure sensor to obtain the pressure detection value $P_0$ in the sealed test chambers comprises:
over the predetermined time t, detecting the pressure in the sealed test chambers by the pressure sensor;
performing vacuumization treatment on the sealed test chambers by the vacuum pump;
repeating detecting the pressure and performing the vacuumization treatment until a change in a detection value of the pressure sensor is less than a preset threshold at a time point; and
determining the detection value of the pressure sensor at the time point as the pressure detection value $P_0$ in the sealed test chambers.

14. The method of claim 12, wherein calculating the hydrogen permeability of the to-be-tested pipe with the pressure detection value $P_0$ comprises:
calculating the hydrogen permeability of the to-be-tested pipe with the pressure detection value $P_0$ based on a formula as follows:

$$J = \frac{P_0 V}{RTL\pi r^2 t}$$

where J represents the hydrogen permeability of the to-be-tested pipe in a unit of $mol/m^2/s$;
$P_0$ represents the pressure detection value in the sealed test chambers in a unit of Pa;
V represents a volume of the sealed test chambers in a unit of $m^3$;
R is a molar gas constant, valued 8.314472, in a unit of J/mol/K;
T is a temperature in the sealed test chambers in a unit of K;
L is a length of the to-be-tested pipe in a unit of m; and
r is a radius of the to-be-tested pipe in a unit of m.

* * * * *